Sept. 15, 1970  R. HALLER  3,528,303
SPINDLE DRIVE MECHANISM
Filed Aug. 27, 1968
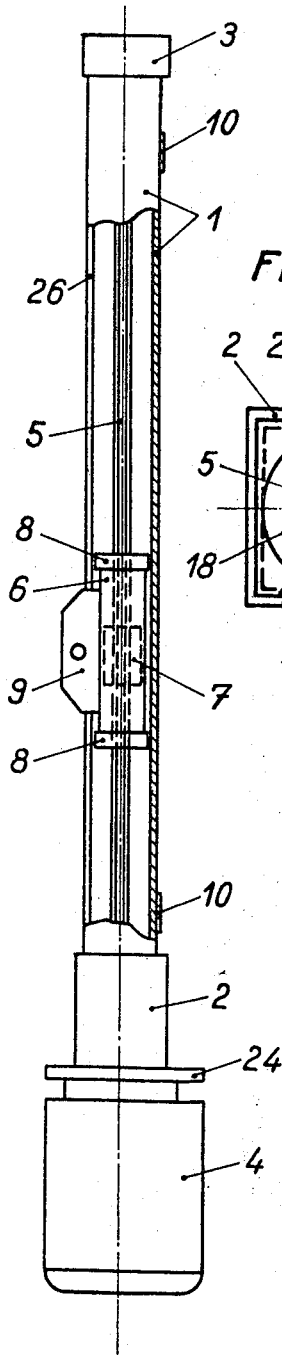
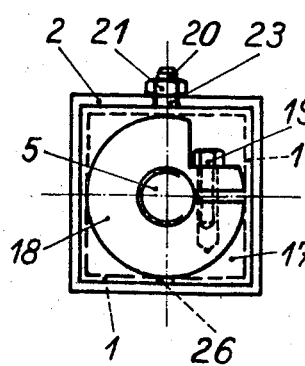
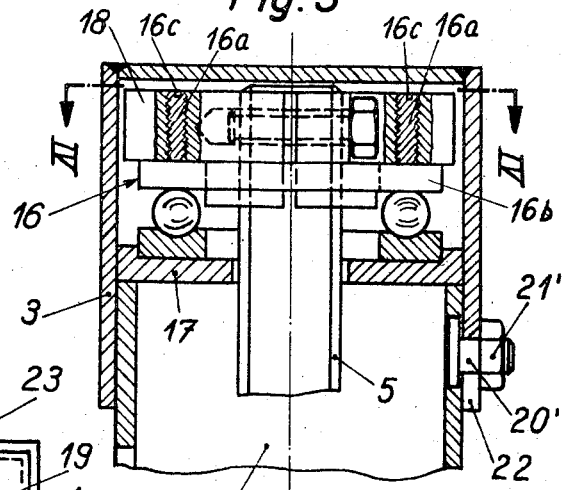
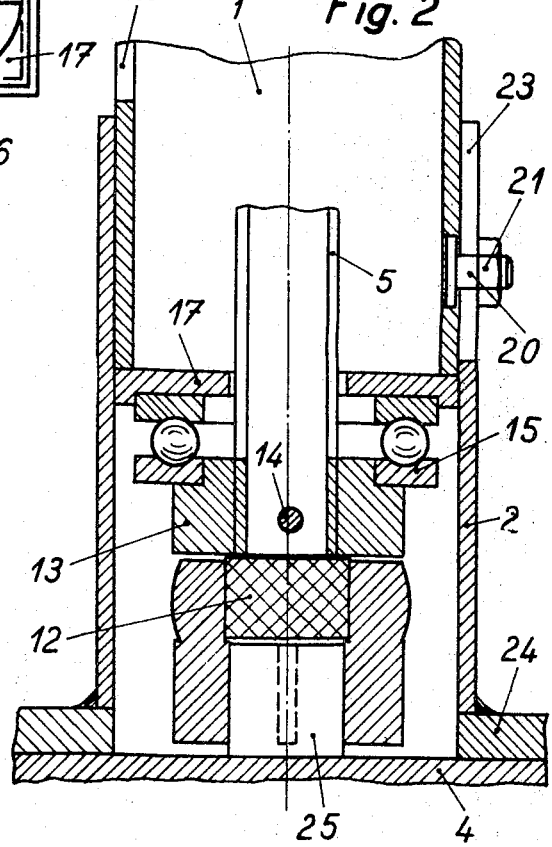
INVENTOR:
Richard Haller,
BY
His Attorney

United States Patent Office 3,528,303
Patented Sept. 15, 1970

3,528,303
SPINDLE DRIVE MECHANISM
Richard Haller, Ueberlandstr. 240,
Dubendorf-Zurich, Switzerland
Filed Aug. 27, 1968, Ser. No. 755,588
Claims priority, application Switzerland, Aug. 31, 1967,
12,214/67
Int. Cl. F16h 25/12
U.S. Cl. 74—89.15        5 Claims

ABSTRACT OF THE DISCLOSURE

A spindle drive mechanism has a tensile pre-stressed spindle and a non-rotatable nut engaging the spindle and arranged to be driven thereby axially.

---

The invention relates to a spindle drive mechanism, and relates more particularly to a spindle drive mechanism in which a non-rotatable nut is driven by the spindle axially of the spindle, and is arranged to exert an outwardly directed force when the spindle is rotated and the nut thus moved.

Spindle drive mechanisms of this type driven by a motor, are known. The force that is exerted outwardly by the nut is taken up by the spindle itself. This, however, either restricts the length of the threaded spindle, or requires that the spindle be made of large diameter, as otherwise the spindle will sag or bend around its middle portion and during rotation will move its middle portion eccentrically. Therefore, long and thin threaded spindles are not well suited for driving the nuts. On the other hand, large diameter threaded spindles of the same length are heavy and expensive.

It is therefore among the principal objects of the invention to provide a spindle drive mechanism in which, in accordance with a preferred embodiment, long and thin spindles may be used for driving nuts movable thereon.

It is another object of the invention to provide for such a mechanism that is free from the drawbacks of the prior art.

Further objects and advantages of the invention will be set forth in part in the following specification and in part will be obvious therefrom without being specifically referred to, the same being realized and attained as pointed out in the claims hereof.

Briefly, the aforesaid objects are achieved by putting the spindle under a tensile pre-stress.

In accordance with a preferred embodiment, the end portions of the spindle, for instance a thread carrying spindle, may be supported between two thrust bearings, such as journal bearings or roller bearings or ball bearings, and the pre-stress tension taken up by a spacer, or the like holding means that keep at a predetermined spaced-apart distance the aforesaid bearings. Where these bearings are arranged movable longitudinally relative to the spindle, the adjustment of the relative distance therebetween may be utilized to set the aforesaid tensile pre-stress.

In accordance with a preferred embodiment, the spacer is in the form of a longitudinally slotted tubular shell of either square or round cross section, and the slot serves as a passage through which the nut can exert its outwardly directed force.

With the above and other objects of the invention in view, the invention consists in the novel construction, arrangement and combination of various devices, elements and parts, as set forth in the claims hereof, certain embodiments of the same being illustrated in the accompanying drawings and described in the specification.

For a fuller understanding of the nature and objects of the invention, reference should be had to the following detailed description, taken in connection with the accompanying drawings, in which:

FIG. 1 is an elevational view, partly in section, of a spindle drive mechanism in accordance with the invention;

FIG. 2 is a large scale fragmentary sectional view showing a detail of the spindle drive mechanism of FIG. 1, including one end portion of the spindle driven by the drive means;

FIG. 3 is a large scale fragmentary sectional view, similar to FIG. 2, but showing the detail of the opposite end portion of the spindle; and FIG. 4 is an end elevational view, seen in the direction IV—IV of FIG. 3, the cover 3 having been removed.

In carrying the invention into effect in the embodiments which have been selected for illustration in the accompanying drawings and for description in this specification, and referring now particularly to FIGS. 1–3, there is provided a tubular shell 1, such as for instance a square tube, and a threaded spindle 5 is journalled between two thrust ball bearings 15 and 16, under tensile pre-stress. A portion of the spindle 5 extends through the interior of the square tubular shell 1.

The spindle 5 is driven by drive means, such as an electric motor 4, the flange 24 of which carries a tubular piece 2. The tubular piece 2 is telescoped over the tubular shell 1, and has a slot 23, and a screw 20 and screwnut 21 secures the tubular piece 2 to the tubular shell 1. Depending on the length of the motor shaft 25, the tubular piece 2 may be moved together with the motor 4 relative to the tubular shell 1 and therefore relative to the spindle 5, and be connected accordingly. A threaded screw 16a having a tool slit 16c, the screw 16a operative to push against the top portion 16b of the bearing 16.

One of the thrust bearings 15 rests on a plate 17 and is guided therein. The plate 17 abuts against one end of the tubular shell 1 and is guided laterally by the tubular piece 2. One end portion of the threaded spindle 5 is threaded into one half 13 of a coupling, and a pin 14 secures the spindle 5 against rotation relative to the coupling half 13.

The coupling half 13 may, if desired, be slotted and be tightened by means of a screw, so that the connection is secure and free from play.

The other coupling half 11 is mounted in a conventional manner on the shaft 24 on the motor 4. Between the two coupling halves 11, 13 there is provided a force transmitting, shock absorbing rubber cross 12 of well known conventional construction.

The other end portion of the spindle 5 is journalled similarly, though is secured with a tightening disk 18 that is threaded onto the spindle 5. The tightening disk may be tightened and clamped by means of a tightening screw 19. The cover 3 telescopes over the end of the tubular shell 1, as shown in FIG. 3. The cover 3 has a slot 22, and is secured to the tubular shell 1 by means of a screw 20' and a screwnut 21' that engages the screw 20'.

A nut 7 engages the spindle 5. In accordance with a preferred embodiment, the spindle 5 carries an external thread which is in threaded engagement with the interior of the nut 7. The nut 7 includes a conventional overload safety device, and carries a plunger 6. The plunger 6 includes guides 8, for instance made of nylon. An extension 9 is mounted on the plunger 6 and serves to transmit the force of the longitudinal movement of the nut 7 when the spindle 5 is rotated and thereby propels the nut 7.

The extension 9 projects through a longitudinal slot 26 that is formed in the tubular shell 1, for transmitting its propulsion force externally of the tubular shell 1.

Where the tubular shell 1 is of square cross section, the guides 8 will also have a square shape, and will be connected to the plunger in such a manner that they cannot be rotated relative thereto. By this arrangement, the forces that tend to rotate the plunger 6 will be taken up by the guides 8, so that the extension 9 will not be in touch with the edges of that define the longitudinal slot 26 in the tubular shell 1. The guides 8 also take up the tilting forces that apply on the plunger 6.

Plates 10 are mounted on the tubular shell 1, and serve for anchoring the entire spindle drive mechanism in accordance with FIG. 1. Where the spindle drive mechanism has a great length, several plates 10 may be mounted on the tubular shell 1, and be distributed throughout the length thereof.

The plunger 6 has a grease filling for lubrication, while the spindle 5 is coated with grease. A suitably mounted grease nipple may serve for the subsequent lubrication of the spindle 5 and of the plunger 6.

The tensioning of the spindle 5 is accomplished as follows: After the two thrust bearing 15 and 16 have been placed against the ends of the tubular shell 1, and the spindle 5 has been placed centrally of the tubular shell 1, the operator will tighten the tightening disk 18, for example by hand or with suitable tools, and thereby the spindle 5 will be tensioned within the framework of permissible forces. Thereafter, the operator will mount the end pieces, namely the tubular piece 2 and the cover 3, on the tubular shell 1, and secure the tubular piece 2 and cover 3 to the tubular shell 1.

In accordance with a modification, the motor 4 may, instead of axially, be mounted on the tubular piece 2 laterally, parallel to the longitudinal extension of the tubular shell 1, and the drive may include a belt or gears. An additional bearing to take up the radial forces may be provided in that event.

As the tubular piece 2 carries the motor 4 with the aid of the flange 24, it is important that the connection between the tubular piece 2 and the tubular shell 1 is well secured. For this purpose, the tubular piece 2 may be mounted on the tubular shell 1 in such a manner that the longitudinal slot 26 on the tubular shell 1 coincides at least for a portion with the slit 23 of the tubular piece 2. The head of the screw 20, in accordance with a modification, will then be so shaped that during tightening of the screwnut 21 on the screw 20, the head of the screw 20 will engage the edges of the longitudinal slot 26 of the tubular shell 1, and will spread apart the tubular shell 1. By this arrangement, the tubular shell 1 will engage throughout its circumference the inner surface of the tubular piece 2. This assures a good connection.

Where the spindle drive mechanism is permanently mounted in one place, the tubular shell 1 may, in accordance with a modification, be replaced by two rigidly mounted supporting means that take the place of the plates 17. It is important that the bearings 15 and 16 in this case are supported by immovable parts. The aforesaid support means will be spaced from each other for a predetermined distance.

As the pre-stressed spindle 5 is at all times only under tensile stress, the instant invention permits the employment of very large stroke lengths and very high rotational speeds. Tests have shown that with with instant invention, stroke lengths of 1.6 meters have been achieved with a spindle that had a diameter of only 10 millimeters.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. In a spindle drive mechanism, for use in connection with rotational drive means, in combination, an elongated rotatable spindle, a nut engaging said spindle and being non-rotatable though movable longitudinally relative to said spindle, translation means operable between said spindle and said nut, whereby said nut will be moved longitudinally of said spindle and will exert a force directed substantially parallel of the longitudinal directions of the spindle when said spindle is rotated, and tension means subjecting at least a portion of said spindle to a longitudinal tensile pre-stress, said translation means comprising a thread mounted on said spindle and being in threaded engagement with said nut, and bearing means, the end portions of said spindle and said tension means being supported by said bearing means, said bearing means comprising two bearings, at least one of said bearing being adjustable in longitudinal direction relative to said spindle.

2. In a spindle drive mechanism, as claimed in claim 1, said bearing means including two bearings spaced apart from each other, said tension means including a spacer disposed between said bearings and being operable to take up said tensile pre-stress.

3. In a spindle drive mechanism, for use in connection with rotational drive means, in combination, as elongated rotatable spindle, a nut engaging said spindle and being non-rotatable though movable longitudinally relative to said spindle, translation means being operable between said spindle and said nut, whereby said nut will be moved longitudinally of said spindle and will exert a force directed substantially parallel of the longitudinal directions of the spindle when said spindle is rotated, and tension means subjecting at least a portion of said spindle to a longitudinal tensil pre-stress, said translation means including a thread formed on said spindle and being in threaded engagement with said nut, said tension means including bearings each supporting an end portion of said spindle, a longitudinally slotted tubular shell disposed between said bearings and forming a spacer, said bearings engaging said tubular shell, said spindle being in driven connection with said drive means for rotating the spindle, said tension means comprising a tightening disk mounted on said spindle and being operable to tension said spindle longitudinally with said tubular shell taking up the tensioning force, said nut having an extension projecting through the longitudinal slot of said tubular shell, said drive means including a motor for driving said spindle, a tubular piece connected to said motor telescoping over an end of said tubular shell and including an elongated slit, and a screw projecting through said slit thereby adjustably securing said tubular shell to said tubular piece.

4. In a spindle drive mechanism, as claimed in claim 3, said longitudinal slot of said tubular piece registering at least for a portion with said longitudinal slot of said tubular shell, said screw having a head in said slot of said tubular shell, a screwnut mounted on said screw, whereby when said screwnut is tightened, the head of said screw will spread apart the edges of said slot thereby promoting the frictional engagement between said tubular shell and said tubular piece.

5. In a spindle drive mechanism, for use in connection with rotational drive means, in combination, an elongated rotatable spindle, a nut engaging said spindle and being non-rotatable though movable longitudinally relative to said spindle, translation means operable between said spindle and said nut, whereby said nut will be moved longitudinally of said spindle and will exert a force directed substantially parallel of the longitudinal directions of the spindle when said spindle is rotated, and tension means subjecting at least a portion of said spindle to a longitudinal tensile pre-stress, said translation means including a thread formed on said spindle and being in threaded engagement with said nut, said tension means including bearings each supporting an end portion of said spindle, a longitudinally slotted tubular shell disposed between said bearings and forming a spacer, said bearings engaging said tubular shell, said spindle being in driven connection with said drive means for rotating the spindle, said tension means comprising a tightening disk mounted on said spindle and being operable to tension, said spindle longitudinally with said tubular shell taking up the tensioning force, said nut having an extension projecting through the longitudinal slot of said tubular shell.

References Cited

UNITED STATES PATENTS

| | | | |
|---|---|---|---|
| 2,504,408 | 4/1950 | Griffin | 74—89.15 |
| 2,640,694 | 6/1953 | Jackson | 74—89.15 |
| 3,014,379 | 12/1961 | Wise | 74—424.8 |
| 3,301,088 | 1/1967 | White | 74—424.8 |
| 3,398,484 | 8/1968 | Katsumura et al. | 74—89.15 |

WESLEY S. RATLIFF, JR., Primary Examiner